Nov. 25, 1969   J. CARBAJAL   3,479,970

TAMALE MAKING MACHINE

Filed March 16, 1967   3 Sheets-Sheet 2

INVENTOR.
Joe Carbajal
BY Scott L. Norvied
atty.

Nov. 25, 1969  J. CARBAJAL  3,479,970

TAMALE MAKING MACHINE

Filed March 16, 1967  3 Sheets-Sheet 3

INVENTOR.
JOE CARBAJAL
BY
Wm. H. Dean

United States Patent Office 3,479,970
Patented Nov. 25, 1969

3,479,970
TAMALE MAKING MACHINE
Joe Carbajal, 117 S. 22nd St., Phoenix, Ariz. 85034
Continuation-in-part of application Ser. No. 450,811,
Apr. 26, 1965. This application Mar. 16, 1967, Ser.
No. 623,718
Int. Cl. A23g 3/00
U.S. Cl. 107—1                                                                   5 Claims

ABSTRACT OF THE DISCLOSURE

A tamale making machine comprising a pair of "masa" and flavoring extruding cylinders having concentric outlets communicating with a nozzle means whereby the "masa" is extruded in an annular cylindrical form with the flavoring extruded concentrically thereof.

---

This application is a continuation-in-part of my copending patent application Ser. No. 450,811, now abandoned, filed Apr. 26, 1965. This invention pertains to tamale making machine of the type commonly consumed in the southwestern part of the United States.

One of the objects of the machine is to provide a mechanism which will form and shape tamales and deliver the stuffing for them in a condition in which they may be placed in the hand of an operator who will manually break off the proper length of tamale and let it lay on a prepared corn husk of the proper size that was previously held in the hand of the operator, so that the husk may be folded over the tamale stuffing to complete the tamale.

A second object is to provide a mechanism which will adequately handle and preserve the so called stuffing substance, used to form the body of the tamale and provide a husk which may then be wrapped as desired as a covering for the body of the tamale.

A third object is to provide a means for cooling and preserving the stuffing material so that spoilage is prevented.

A still further objective is to provide mechanism as aforesaid which can easily be cleaned and replaced, when desired.

A further object is to provide an extrusion nozzle which will extrude the stuffing substances for the tamale, including the chile and meat mixture usually found in the center of the tamale and cover this with a coating of cooked corn dough known as "masa"; said substance being extruded from the machine in a way so that lengths of the stuffing may be broken or sequeezed off to form individual tamale bodies.

Other objectives will appear hereinafter.

I attain the foregoing objects by means of the devices and parts and composition of parts shown in the accompanying drawings in which.

Figure 1:
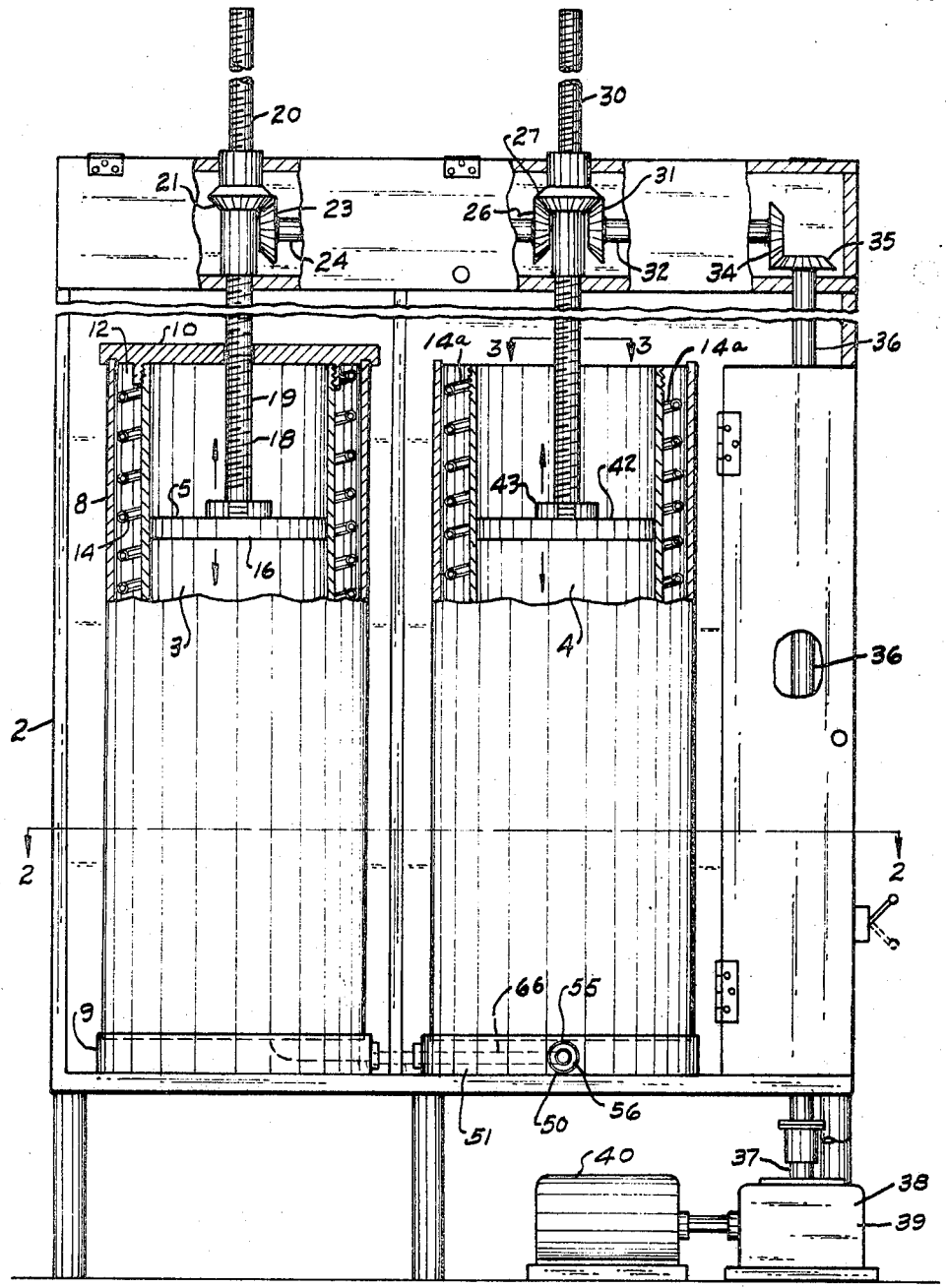
FIG. 1 is a front elevational view of the entire machine with parts broken away to show interior construction.

The machine in general consists of two cylinders 3 and 4 and held in a frame 2. The cylinders contain substances used to stuff the tamales to be made. Each cylinder is constructed substantially the same.

Cylinder 3 has a piston 5 which is fitted into it so as to extrude or force out the material contained in this cylinder into a pipe 66, in the bottom of the cylinder. This substance is usually the mixture known as the core of the tamale and consists of cooked meat and chile and such other substances as are desired for flavor. It will be noticed that this cylinder has an outer jacket 8, which is fitted at the bottom into the base closure plate 9 and is closed at the top by the lid 10. The pipe 66 communicates with the interiors of the cylinders and with the interior of the cavity 65 therein. The space 12 between the cylinder 3 and the outer wall 8 is cooled by a coil 14, containing refrigerating substances such as an expanded refrigerated gas commonly used in small refrigeration machines. This may be ammonia, methyl chloride, ethylene bichloride or the like. The cylinder 3 surrounds a piston 16, which is held by a piston rod 18, which is provided with threads 19 engaged by an internally screw threaded nut 19–A connected to a mitre gear 21, which affects a thrust bearing 21–A supported by frame 2 and is confined by thrust to control end thrust. The nut is threaded and operated by bevel gear 21, which in turn is driven by driving bevel gear 23 and keyed to transverse shaft 24. This structure makes it possible for the shaft 24, when provided with bevel gear 26, to take motion from bevel gear 27, carried by an internally screw threaded nut 27–A on the threaded piston rod 30. The nut 27–A abuts a thrust bearing 30–A supported by the frame 2. The gear 27 is driven by bevel gear 31 on shaft 32, which is, in turn, driven by bevel gear 34 and bevel gear 35 on vertical shaft 36. Vertical shaft 36 is in turn driven by a shaft 37, which extends upward from the case 38 of gear box 39. The gearing and gear box 38 is driven by motor 40, so as to reduce the speed of vertical shaft 37 and increase the power applied. Thus the shafts 20 and 30 are driven at slow speed and with sufficient power to operate their screw nuts and respective pistons.

Figure 4:
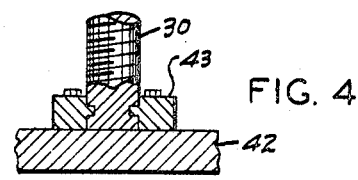
FIG. 4 is a fragmentary sectional elevational view of one of the extrusion pistons together with the attachment to the screw jack rod used to operate the piston and having means for quick removal of the piston from the rod for cleaning.

Cylinder 4 is provided with piston 42 on piston rod 30 which is likewise threaded throughout its length except for its lower end while its lower end bears in a thrust collar 43 in the center of the piston. As shown in FIG. 4, the collar 43 is rotatably mounted on the lower end of the piston rod 30 and the collar 43 is bolted or otherwise fixed to the piston 42.

Cylinder 4 contains masa, which is a soft fluid-like mush usually made of corn dough, water and salt and forms the outer coating of the core flavoring material contained in cylinder 3. Cylinder 4 has an extrusion vent 50 at its bottom projecting radially from the bottom closure plate 51.

It is to be noted that the meat and or flavoring material is extruded through a pipe 53, which is centrally and axially positioned within the nozzle 55.

Figure 2:
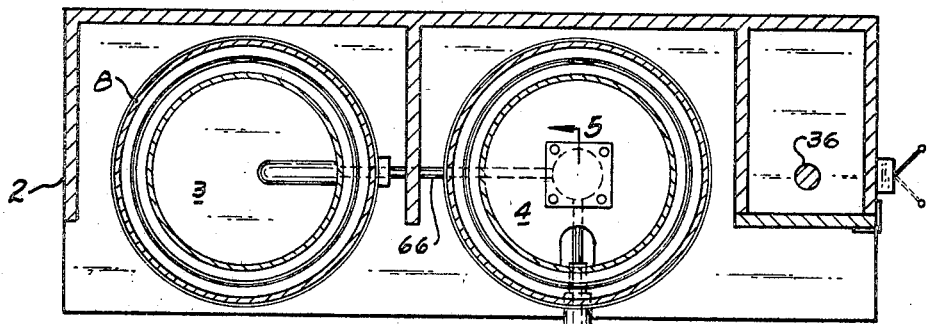
FIG. 2 is a sectional plan view and taken substantially on line 2—2, FIG. 1.
Figure 3:
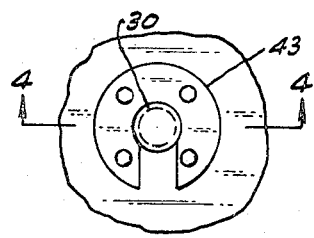
FIG. 3 is a fragmentary portion of one of the extrusion pistons shown in section, substantially on line 3—3, FIG. 1.

Both the flavoring and masa materials are extruded simultaneously with the flavoring material being positioned inside the masa. The body of the tamale is thus formed by the two substances with the flavoring axially disposed on the inside and the corn dough masa on the outside, in a manner substantially as heretofore, made by hand. Both materials are extruded from the mouth 56 of the nozzle 55 with the masa forming a covering for the flavoring material. While these substances are extruded as cylinders, they are sufficiently soft so that when caught and received on a corn husk, held by the operator just below the exit 56 on the nozzle 55, the composite stuffing for the tamale will flatten somewhat which will aid the operator in folding the edges of the corn husk over the double concentric extrusion. After the composite tamale has been extruded on its corn husk A (FIGURE 2) it is transferred manually by the operator to a table (not shown). Thereafter the operator wraps the tamale in parchment paper to complete the tamale. The parchment paper over the corn husk seals the tamale so the flavor is preserved.

When completed, there is a center tamale body which is the edible part and which consists of a core of flavorful ground and or chopped meat, etc., and which is covered with a layer of masa, both wrapped in one or two layers of corn husk. This completes the tamale.

Obviously, the husk is not eaten but acts as a container for the interior portion and when it is desired to eat the tamale, the outer layer of the corn husk is broken open and the interior is eaten in the usual manner.

It is noted that the cooling coil 14 in the space between the cylinder 3 and the outer cover 8 of the first described cylinder is used to provide sufficient refrigeration to prevent spoilage or souring of the substance contained in cylinder. It is to be understood also, that refrigeration coil 14–A is used to refrigerate the masa within the cylinder 4.

Figure 5:
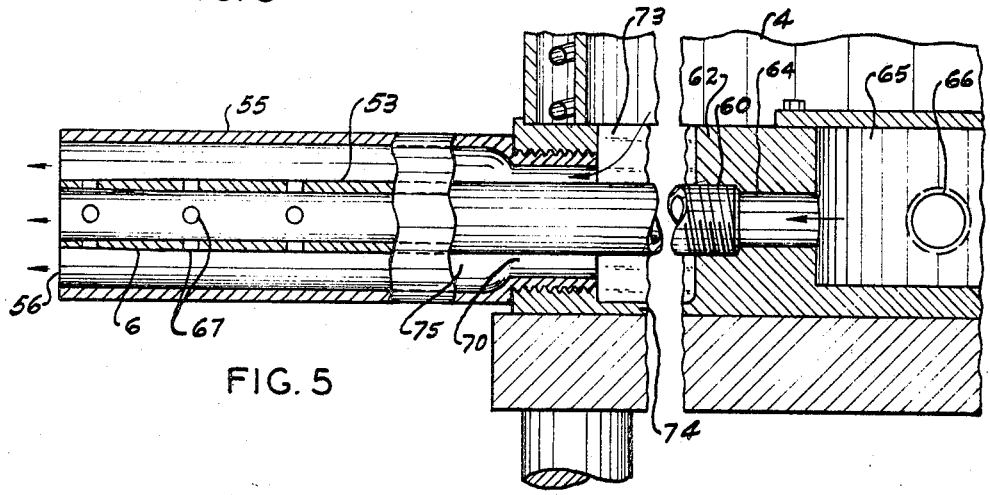
FIG. 5 is a fragmentary sectional view taken substantially on line 5—5, FIG. 2.

It will be understood that the refrigeration cooling of the cylinders 3 and 4 provides for viscosity control of the flavoring material and the masa respectively so that extrusion apportioning may be attained when extruding the flavoring concentrically in the masa and through the nozzle structure as disclosed in FIG. 5 of the drawings. Those skilled in the art will appreciate the utility of the refrigeration means for consoling viscosity or extrusion density of the flavoring material as well as the masa, so that uniform proportioning of the flavoring and masa may be influenced by the temperature of the material.

Reference is now made particularly to FIGURE 5, which shows the arrangement of parts necessary to provide the edible interior of the tamale. Here the interior pipe 53 is centrally positioned within the nozzle 55 and is screwed at its rear end 60 into the base 62 closing the lower end of cylinder 4. This pipe then communicates through a drill hole 64 in said base 62 to a cavity 65 in said base. This cavity receives the meat and chile mixture from pipe 66, which in turn is connected to the bottom of cylinder 3. The outer end of pipe 53 is constricted somewhat so as to compress the substances which it contains just before it is extruded. Note also that there are auxiliary holes 67, which permit some of this mixture to extrude radially into the masa before it leaves the exit end of the nozzle 55.

Note also that there is a compressive throat 70 in the interior end of nozzle 55 which tends to compress the masa as it leaves the cavity 73 in section 74 of base 62. After the masa has been forced out through throat 70, it expands into the somewhat enlarged exit throat 75 and continues out through the annular space between the exterior wall of the pipe 53 and the interior wall of the nozzle 55. This action is very important to the proper operation of the device. The expansion causes the flavoring substances in the meat and chile mixture in pipe 53 to permeate the substance of the masa as it is being extruded. This distributes the flavoring as well as the meat substance into the hollow interior of the masa being extruded and improves the flavor of the entire tamale. The expansion of the masa also tends to accomplish softening thereof.

These tamales are made with white corn dough, called masa. With this tamale machine, I can make many kinds of tamales by changing the flavoring and using different nozzles of different sizes.

Figure 6:
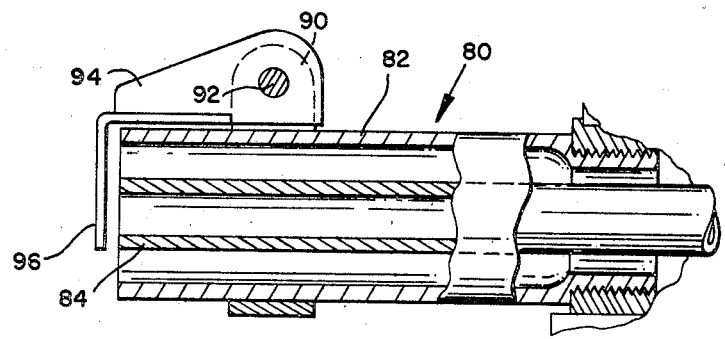
FIG. 6 is a fragmentary sectional view similar to FIG. 5 but showing a modified form of the invention for producing tamales with masa covered weiners.
Figure 7:
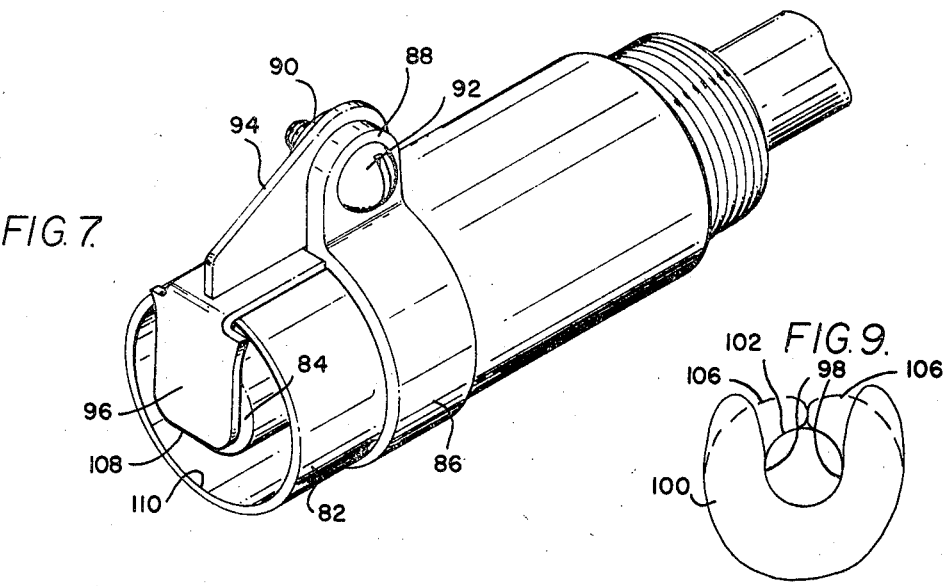
FIG. 7 is a perspective view of the open end of the nozzle structure shown in FIG. 6.

In the modified structure as shown in FIG. 6 of the drawings, a tamale extrusion nozzle assemble 80 comprises a masa extruding tube 82 and a flavoring extrusion tube 84 concentrically and internally thereof. These tubes 82 and 84 are similar to the tubes 55 and 53 respectively shown in FIG. 5 of the drawings.

Figure 9:
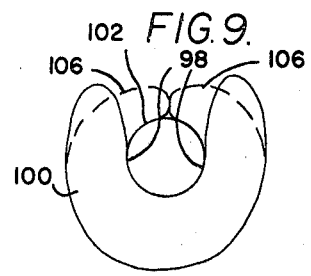
FIG. 9 is a diagrammatic cross-sectional view of the masa extruded as shown in FIG. 8 and illustrating further by the broken lines the wrapping of the masa around a weiner to produce a weiner tamale.
Figure 8:
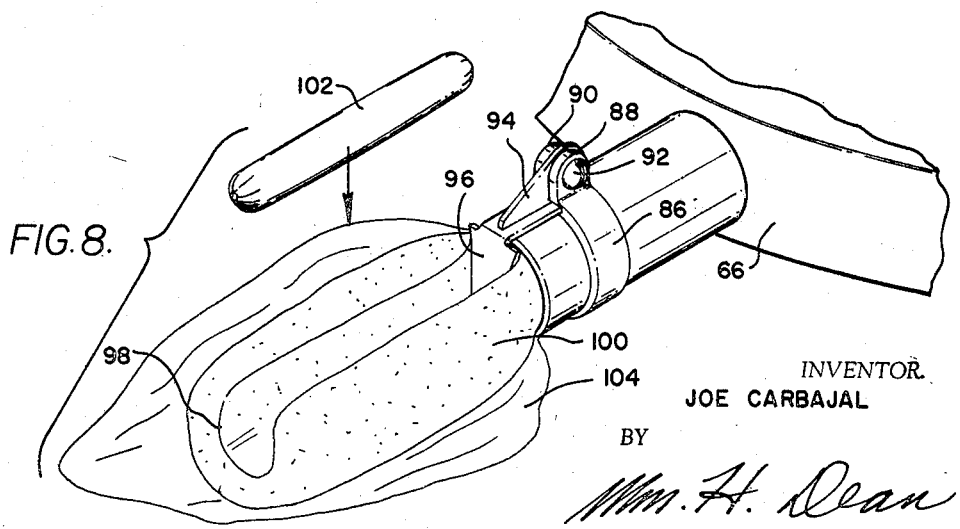
FIG. 8 is a perspective view of masa being extruded from the nozzle as shown in FIG. 7 and further illustrating a weiner to be inserted into a channel in the masa.

Engaging the periphery of the tube 82 is a clamp 86 having opposed clamp portions 88 and 90 held together by a screw 92. Disposed between the portions 88 and 90, is a bracket 94 mounted on the screw 92, and having an extending die portion 96 connected therewith. This die portion 96, is held in a position to overlay the open extruding ends of the tubes 82 and 84 such that when masa is extruded from the bore of the tube 82, that a channel 98 is formed in the masa 100 as shown best in FIGS. 8 and 9 of the drawings. The outer edge of said die portion 96 is generally U-shaped and one end of said die portion is suspended from the bracket 94 and disposed to interfere with the extrusion of masa at the periphery of the bore 110 so that the channel 98 formed in the masa 100, is opened upwardly to permit the insertion of a weiner 102 into the channel 98 as indicated in FIGS. 8 and 9 of the drawings.

As the masa 100 is extruded, the operator places a corn husk 104 thereunder and drops the weiner 102 into the channel 98 and then the corn husk 104 together with the masa is wrapped around the upper portion of the weiner 102 as indicated by broken lines 106 to encapsulate the weiner in the masa 100. The corn husk is then wrapped around the entire tamale and a weiner tamale is thus produced.

It will be appreciated that the end 108 of the substantially U-shaped edge of the die member 96 terminates a short distance from the bore wall 110 of the tube 82 to provide for the channel-shaped in cross-section extrusion of masa 100 so that the weiner 102 may be inserted therein.

During the use of the die 96 for forming the channel 98 in the masa 100, the extrusion of material from the cylinder 3 is interrupted simply by leaving the cylinder 3 vacant. Accordingly, when it is desired to produce weiner tamales, no flavoring material is extruded through the nozzle tube 84.

I claim:
1. A tamale making machine comprising a supporting frame, a cylinder for receiving and extruding a mixture of meat and flavoring material disposed within said frame, a base closing the bottom of said cylinder, said base having an approximately central exit opening, a piston operative in said cylinder to force the material in said cylinder through said exit opening, a second cylinder disposed within said frame adapted to receive and extrude masa, a piston operative in said second cylinder; a base closing the bottom of said second cylinder and having a centrally disposed cavity connected to a radial opening in said last named base connected to said first cylinder, and to an extrusion pipe; a nozzle, said last named base having a passageway connecting said nozzle to the interior of said second cylinder; said pipe axially and concentrically disposed within said nozzle and connected to said cavity; said nozzle and said pipe being adapted to extrude a cylinder of masa and a core of flavoring material simultaneously; means for operating said pistons to extrude the material from their respective cylinders; said means including a screw and nut operative on each of said pistons respectively; and motor means for operating said piston operating mechanism.

2. A tamale making machine of the type described in claim 1, wherein; a jacket is positioned around said cylinder, a refrigerating and cooling coil disposed within the annular space between said cylinder and said jacket and means for forcing cooling fluid into said cooling coil and means for forcing refrigerant through said coil.

3. The invention, as defined in claim 2, wherein; said refrigerating and cooling coil operate to control relative viscosity of the material extruded from the cylinder.

4. A tamale making machine comprising a supporting frame, a cylinder for receiving and extruding a mixture of meat and flavoring material disposed within said frame, a base closing the bottom of said cylinder, said base having an approximately central exit opening, a piston operative in said cylinder to force the material in said cylinder through said exit opening, a second cylinder disposed within said frame adapted to receive and extrude masa, a piston operative in said second cylinder; a base closing the bottom of said second cylinder and having a centrally disposed cavity connected to a radial opening in said last named base connected to said first cylinder, and to an extrusion pipe; a nozzle, said last named base having a passageway connecting said nozzle to the interior of said second cylinder; said pipe axially and concentrically disposed within said nozzle and connected to said cavity; said nozzle and said pipe being adapted to extrude a cylinder of masa and a core of flavoring material simultaneously; means for operating said pistons to extrude the material from their respective cylinders; said means including a screw and nut operative on each of said pistons respectively; and motor means for operating said piston operating mechanism; said pipe in said nozzle having radially opening holes to permit radial extrusion of said flavoring material in addition to extrusion through the end thereof.

5. In a tamale making machine the combination of: means for extruding masa through a tube; a circular in cross-section hollow tube provided with a bore having an outlet; and a die portion disposed at the outlet of said tube, said die portion being a stationary plate fixed in overlying position relative to said open outlet and extending from a peripheral area of said outlet where a portion of said plate interferes with the extension of masa at the peripheray of said bore of said tube and terminating at an area near the center of said outlet whereby an elongated generally channel shaped masa may be extruded into which a weiner may be inserted.

References Cited

UNITED STATES PATENTS

| 1,309,643 | 7/1919 | Leich et al. |
| 1,384,310 | 7/1921 | Dungan. |
| 1,664,337 | 3/1928 | Vanderput. |
| 1,839,180 | 12/1931 | Bergner. |
| 2,193,147 | 3/1940 | Stricker. |
| 2,693,835 | 11/1954 | Lundell _____ 107—14 |

WALTER A. SCHEEL, Primary Examiner

ARTHUR O. HENDERSON, Assistant Examiner

U.S. Cl. X.R.

18—13